Jan. 29, 1963
L. B. NEIGHBOUR
3,075,658
SILO UNLOADER
Filed Feb. 15, 1960
3 Sheets-Sheet 1
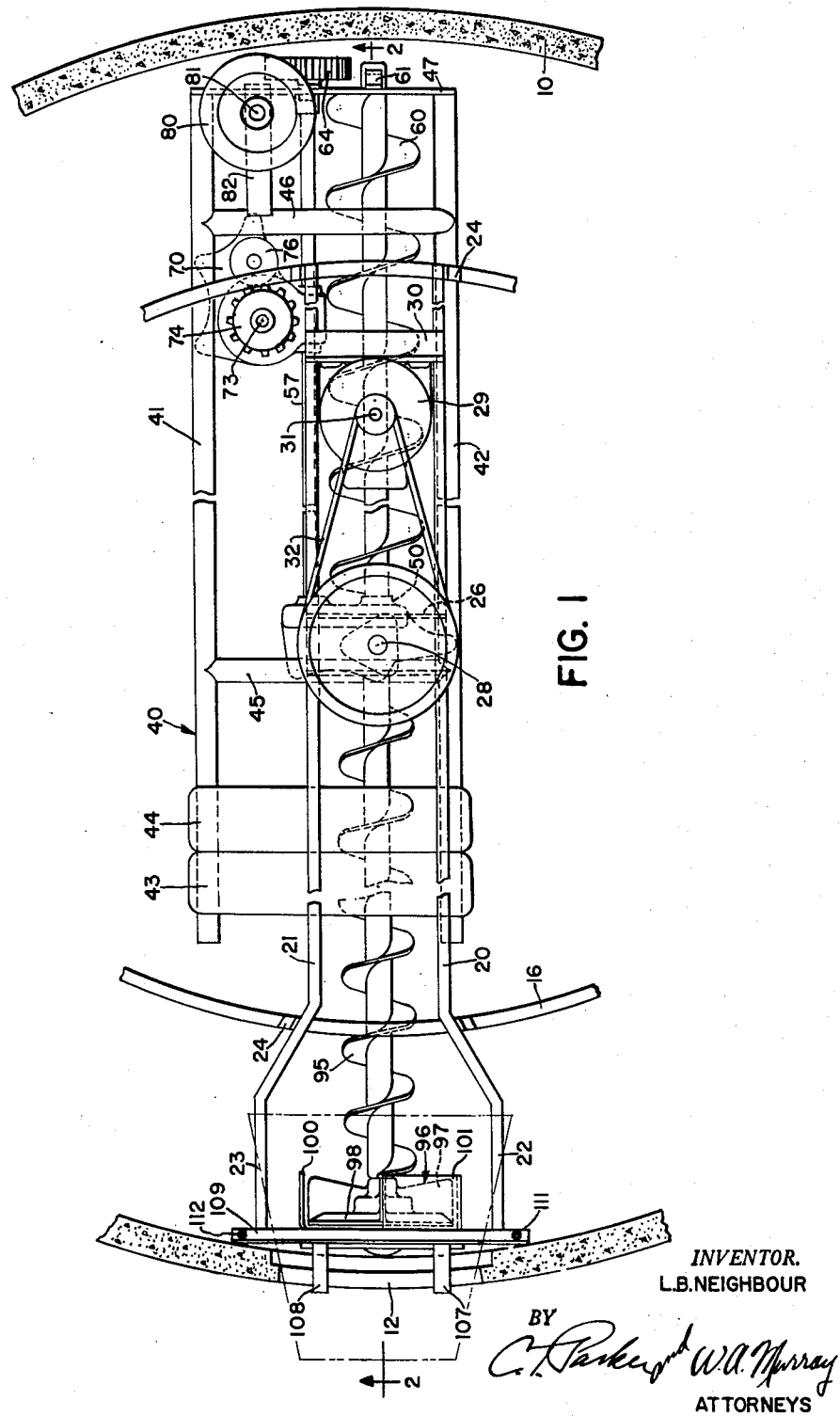
FIG. I
INVENTOR.
L.B. NEIGHBOUR
BY
ATTORNEYS Jan. 29, 1963 L. B. NEIGHBOUR 3,075,658
SILO UNLOADER
Filed Feb. 15, 1960 3 Sheets-Sheet 2
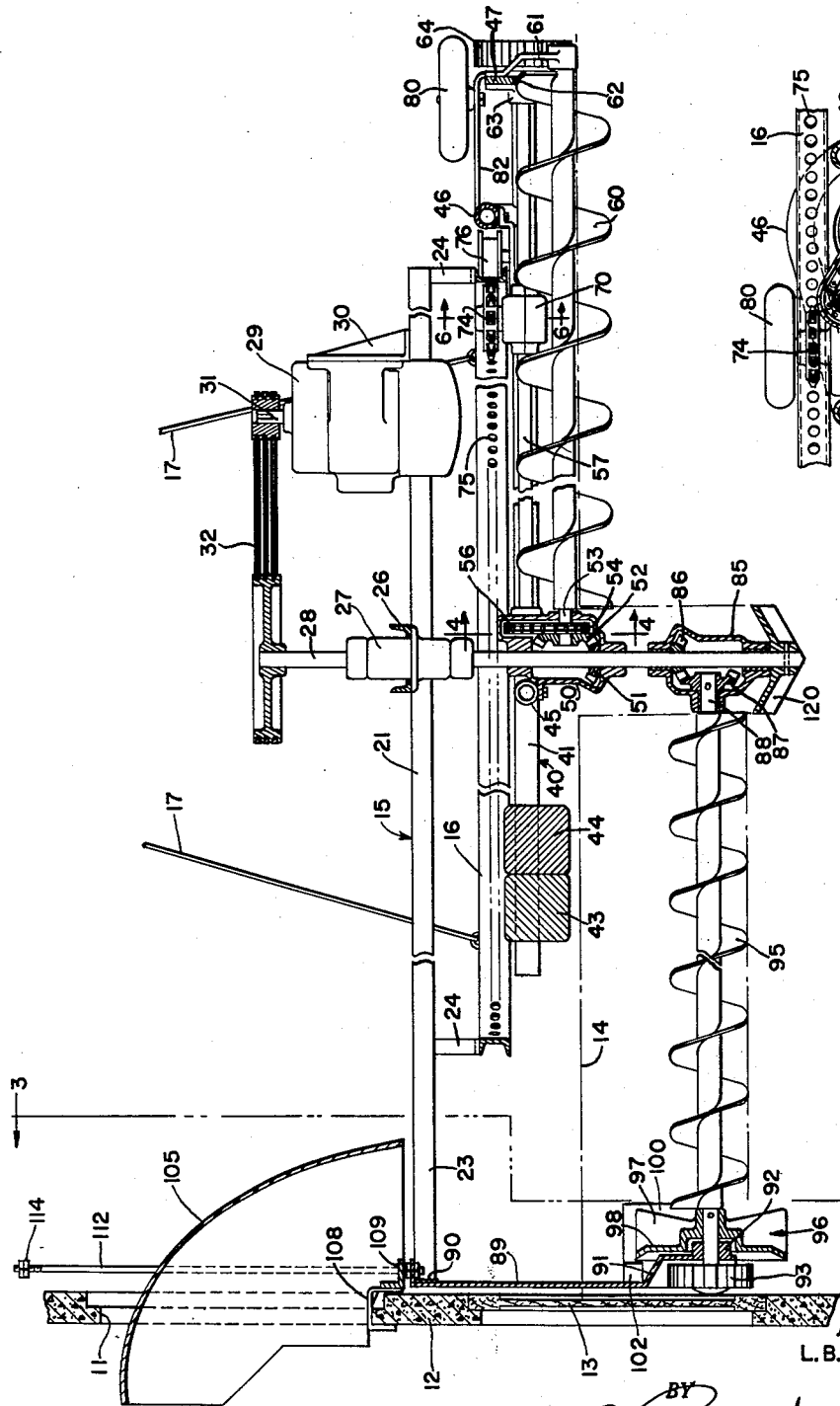
INVENTOR.
L. B. NEIGHBOUR
ATTORNEYS

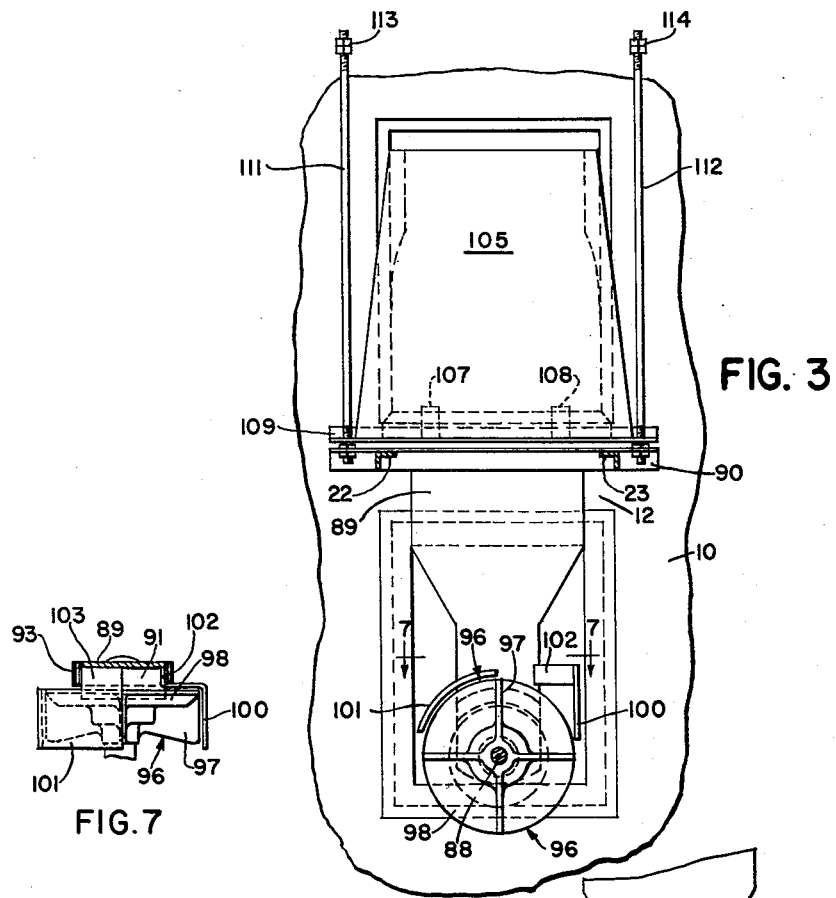

United States Patent Office 3,075,658
Patented Jan. 29, 1963

3,075,658
SILO UNLOADER
Leonard B. Neighbour, Moline, Ill., assignor to Deere & Company, Moline, Ill., a corporation of Delaware
Filed Feb. 15, 1960, Ser. No. 8,601
7 Claims. (Cl. 214—17)

This invention relates to a silo unloader of the type which discharges silage from its top surface through a discharge opening at one side of the silo.

One of the more conventional methods of surface discharging silage is to provide a conveyor mechanism which sweeps over the upper surface of the silage and moves the silage radially inwardly to the central portion of the silo to an impeller which directs the material outwardly through the opening in the silo wall.

There are certain limitations in this type silo unloader, the primary limitation being that the impeller often does not have the power to impel silage from the center of the silo to the opening when it is operating in a relatively large diameter silo. Also, since there is normally a limited amount of power available to operate the various mechanisms on the silo unloader, in many instances, and particularly on the larger size silos, the electric motor used to operate the impeller and other mechanisms of the silo is relatively large. Consequently, in many instances the motor requires a special electrical setup which creates additional installation expense.

It is therefore the purpose of the present invention to provide a silo unloader of a new and novel design carried on a main frame suspended from the top of the silo and includes a radial discharge auger extending from the center of the silo to the wall of the silo and adjacent the discharge opening. The radial auger operates to dig its own trench in the upper surface of the silage. Further provided on the main frame is a radial sweep, preferably of an auger type, which moves angularly about the surface of the silage and sweeps or augers the silage into the trench of the radial auger. At the outer end of the radial auger is provided an impeller which drives the silage vertically and adjacent to the silo wall. Extending inwardly and into the silo from the discharge opening in the wall of the silo is a deflector which intercepts the silage impelled by the impeller and guides it outwardly of the silo wall. The deflector is spaced vertically above the radial discharge auger and is so spaced as to permit the sweep auger to pass between the discharge auger and the deflector.

The main advantage of this type of unloader is that the impeller will be positioned directly beneath the deflector and while spaced therefrom will be relatively close so that a relatively small impeller may be used. A further advantage of this type of silo unloader is that the silage will be swept inwardly by the auger sweep and then downwardly into the radial discharge auger and consequently gravity is utilized partially to move the silage to the impeller.

A further object of the invention is to incorporate in this type of silo unloader drive mechanism or transmissions which operate from a single driven shaft adjacent the center of the silo which may be driven from a single motor carried on the main frame. The driven shaft operates both the radial sweep auger, the radial discharge auger, and the impeller.

Other objects and advantages of the present invention will become apparent to those skilled in the art as the nature of the invention is better understood from the following description and as shown in the accompanying drawings.

FIG. 1 is a plan view of the silo unloader including parts of the silo wall.

FIG. 2 is a vertical sectional view taken substantially along the line 2—2 of FIG. 1.

FIG. 3 is a sectional view taken substantially along the line 3—3 of FIG. 2.

FIG. 4 is a sectional view taken substantially along the line 4—4 of FIG. 2.

FIG. 5 is an end view of a scraper element for cleaning the wall of the silo.

FIG. 6 is an enlarged sectional view taken along the line 6—6 of FIG. 2.

FIG. 7 is a sectional view taken along the line 7—7 of FIG. 3.

The silo in which the present invention is to be used is of the conventional type having an outer upright cylindrical wall 10 with a plurality of vertically spaced openings 11 on one side of the silo. The openings 11 are separated by a series of vertically spaced cross members 12 serving to bridge the space between the edges of the openings. The cross members 12 may either be of metal, or may be of the same material as the silo wall if such provides sufficient strength. In either case, the openings 11 are conventionally closed by doors, one being shown at 13, fitting internally of recessed portions in the cross members 12. As is conventional, the doors may only be removed from inside the silo and cannot be removed from outside the wall 10. Also, since the silage will normally form against the doors 13, the silage itself will force the doors into a relatively tight fit in the silo wall. In this type of silo, therefore, the level of the silage must be below the door's lower edge before the door can be removed from the opening. Since the silage level, as indicated at 14 in FIG. 2, is adjacent the door 13, the nearest opening through which silage may be discharged is the opening shown above the door 13.

The silo unloader is composed of a main frame, here indicated by the reference numeral 15 having an annular ring or track 16 formed about an axis generally located on the axis of the silo. The main frame 15 is suspended from the top of the silo by a series of cables 17 connected angularly about the upper edge of the track 16. The main frame 15 further includes a pair of laterally spaced angle-iron beams 20, 21 extending across the silo and flared outwardly relative to one another at 22, 23 adjacent the opening 11. As will later become apparent, the purpose of the flared ends 22, 23 is to avoid interference with silage passing upwardly toward the opening 11. The angle iron member 20, 21 are rigidly supported by the annular track 16 by means of vertical brackets 24 which are welded to and extend from the upper flange of the track 16 and to the vertical flanges of the respective arm members 20, 21.

Interconnecting the angle irons 20, 21 and extending through the vertical axis of the silo is a U-shaped channel member 26 supporting a central upright journal structure 27 carrying a rotatable shaft 28 substantially on the central axis of the silo. An electric motor 29 is supported on the angle iron members 20, 21 by means of an upright brace 30 which extends across and is welded to the upper flanges of the channel members 20, 21. A motor shaft 31 drives the central shaft 28 by means of a belt and pulley drive 32.

Supported by the main frame 15 is a subframe, indicated in its entirety by the reference numeral 40, composed of a pair of elongated side beams 41, 42 which extend radially across and adjacent the top of the silage. The side beams 41, 42 are on opposite sides of the upright shaft 28 and extend from one end adjacent the wall 10 to an opposite end beyond the center of the silo. The side beams 41, 42 are interconnected at the latter end by means of the pair of weights 43, 44 which may be adjusted longitudinally on the side beams 40, 41, a cross brace 45 which extends closely adjacent the shaft 28, and a cross brace 46 which is arched to clear various mechanisms in the silo unloader. The ends of the beams 41, 42 adjacent the walls 10 are further interconnected by an upright plate 47. Bolted to the centrally located cross brace 45 is a transmission housing 50 carried for relative rotation on the shaft 28. The housing 50 houses a bevel gear transmission comprising a pinion gear 51 fixed to the shaft 28 and a driven gear 52 fixed to a radially extending auger shaft 53. A chain sprocket 54 is fixed to the auger shaft 53 just outwardly of the bevel gear 52. The sprocket 54 is an initial part of a chain drive composed of a second sprocket 55 and chain 56. The sprocket 55 is fixed to a radial shaft 57 which is to one side and above and generally parallel to the auger shaft 54. The housing 50 is cast to contain the bevel gear drive as well as the chain drive.

Carried on the auger shaft 53 is an auger or sweep conveyor 60 extending from the central area of the silo radially outwardly to a terminal end adjacent the wall 10. The outer end of the auger shaft 53 is supported by a journal support 61 carried in depending fashion from the plate 47. The plate 47 is cut away (FIG. 4) at 62 to permit the auger 60 to pass under the plate. The shaft 57 extends outwardly to a terminal end adjacent the wall and is supported also from the plate 47 by means of a journal support 63 carried on the inner face of the plate 47. Outwardly of the plate 47 and rather closely adjacent the wall 10 is a rotary cutter element 64 mounted on the outer end of the shaft 57 which operates to cut silage from the wall 10.

A gear transmission housing 70 is supported from the under side of the cross brace 46 and the under side of the elongated beam 41. The housing 70 is cast in two pieces to permit access to a worm 71 carried on the shaft 57 and an associated worm gear 72 carried on a short upright shaft 73. The upper end of the shaft 73 carries a sprocket or wheel 74. The annular track 16 is provided with a series of angularly spaced openings 75 spaced on the order of and for receiving the teeth of the sprocket 74. Consequently as the shaft 57 is rotated the sprockets 74 will drive the entire secondary frame 40 angularly around the silo. Since the shaft 57 will rotate in response to rotation of the auger shaft 53, the auger 60 will also feed material inwardly as the auger 60 is swept angularly around the silo. Stationed radially outwardly of the track 16 and supported on a flanged portion of the housing 70 is a rotary type guide 76 which fits behind the track 16 and offers backing support for maintaining the teeth of the sprocket 74 in the respective openings 75 of the track 16. It also affords vertical support to frame 40.

The subframe 40 further supports at its end adjacent the wall 10 a guide wheel 80 of an inflatable type which will operate closely adjacent and will at times contact portions of the silo wall 10. The wheel 80 is carried on a vertical shaft 81 carried on a bracket 82 extending between the cross brace 46 and the end plate 47.

Reviewing the structure up to this point, it should be recognized that the cable 17 will so position the ring 16 and its associated main frame 15 that the auger 60 will ride on the surface of the silage and upon rotation of the subframe and the auger 60 will sweep over the top surface and drive the silage centrally to an area adjacent the shaft 28.

Positioned beneath the sweep auger 60 and particularly the sweep auger transmission housing 50 is a second transmission housing 85 containing a bevel pinion 86 and a bevel gear 87 mounted on a laterally disposed and radially extending auger shaft 88. The auger shaft 88 extends radially outwardly to an outer end adjacent the wall of the silo and proximate the discharge openings 11. The outer end of the shaft 88 is supported directly by the main frame 15 by means of an upright plate 89 positioned adjacent the door 13 and lies closely proximate the door. The upper end of the plate 89 is fixed to an angle iron cross member 90 a laterally disposed flange overlying and welded to the outer ends 22, 23 of the angle iron beams 20, 21 forming the main portion of the main frame 15. The lower end of the plate 89 is necked down and is offset inwardly at 91 and is provided with a journal or hub 92 through which the auger drive shaft 88 extends. Outwardly of the offset portion 91 and carried on the outer end of the shaft 88 is a rotary cutter 93 operating to cut the silage adjacent the wall and to clear the area of the silo beneath the plate 89. Also carried on the auger shaft 88 is an auger flight 95 formed to move materials from the central portion of the silo outwardly to a position adjacent the doors 13. The outer end of the auger 95 terminates relatively close and yet spacedly from the door 13. The auger shaft 88 carries in the space between the outer end of the auger 95 and the flange portion 91 of the plate 89 a rotary impeller 96 having radial blades 97 fixed to and extending inwardly from a back plate 98. Consequently as the silage is moved radially outwardly by the auger 95 the silage will be impelled upwardly by the impeller blades 97. Fixed to the inner face of the end plate 89 is a pair of spaced apart guide shields 100, 101 serving as an impeller housing to guide the silage upwardly from the impeller blades. The impeller structure 96 is left open at its lower extremities so that the impeller may operate to dig its own trough when necessary. The shields 100, 101 are fixed by integral bracket portions 102, 103 above and generally within the confines of the area cut from the silage by the cutter 93.

A deflector 105 is positioned in the opening above the level 14 of the silage. The deflector 105 extends into the silo and operates to deflect material impelled by the impeller 96 outwardly of the silo, the outer terminal end of the deflector being there terminated. The deflector 105 is formed in the shape of a funnel generally wider at its lower end than at its upper end so as to operate to gather the silage as it guides it outwardly. The sides of the deflector 105 are fixed, by welding, to an angle iron brace 109 extending across the lower edge of the opening. The brace is fixed to a pair of hanger members 107, 108 positioned to lie over the upper edge of the cross support structure 12. Consequently the deflector 105 is substantially fixed in a position spacedly above the impeller 96 to permit the auger sweep and its associated frame to sweep between the deflector and the auger 95.

The laterally disposed angle iron members 90, 109 are loosely interconnected by a pair of laterally spaced rods 111, 112 extending through the laterally disposed flanges of the members 90, 109. The rods 111, 112 are of considerable height and are provided with stop nuts 113, 114 at their upper ends. The rods 111, 112 by passing through the flange of the cross member 109 permit relative vertical movement between the main frame 15 as well as the entire silo unloader and the deflector 105. Since the deflector 105 is fixed against vertical movement, the silo unloader therefore may move downwardly as the surface of the silage is lowered due to silage discharge.

There is further provided a laterally rotating cutter blade 120 fixed to the shaft 28 at its lower end operating to dig or otherwise remove the silage next adjacent to the shaft 85. Due to rotation of the cutters 120 there will exist a column of either loosened or removed silage at the center of the silo at a level beneath the discharge auger 95. Generally as the silage is forced up by the cutters 20, it will enter into the area of the auger discharge 95 to eventually be discharged from the silo. Also, due to the fact that there is a relatively empty column at the center of the silo, material being moved into the center by the sweep auger 60 is permitted to gravitate freely to the area of the discharge auger 95 and from there to be discharged by the impeller 96.

The silo unloader operates in the following manner. As mentioned previously, the location of the unloader in the silo may be controlled externally of the silo by means which operate to adjust the effective length of the cables 17. Since the silage must be removed adjacent the doors 13 in the opening prior to removal of the door, the deflector 105 must by necessity be placed in an opening 11 above the surface of the silage. The entire frame 15 will be permitted to move downwardly relative to the deflector through means of the sliding connections between the rods 111, 112 and the lateral flange of the angle iron member 109. The auger 95, impeller 96, and cutter wheel 93 as well as the rotary cutter 120 will operate to dig their own trench beneath the surface of the silage. Since all are connected to the main frame 15 which is restricted against angular movement, the discharge auger 95, impeller 96, and cutter wheel 93 will be retained in a constant vertical plane throughout the operation of unloading silage.

In unloading silage, the auger 60 will either feed the silage from the surface of the silage inwardly to the cavity or empty column formed by the cutter wheel 120 or will drop it into the trench formed by the discharge auger 95 as the auger sweep 60 sweeps over the trench. In either case, the silage eventually reaches the discharge auger 95 where it will be swept into the impeller and directed upwardly to the deflector 105 and from there outward of the silo wall 10.

While only one form of the invention has been shown it should be recognized that other forms and variations will occur to those skilled in the art. Therefore, while the present form was shown and described in detail for purpose of clearly and concisely illustrating the principles of the invention, it was not the intention to limit or narrow the invention beyond the broad concepts set forth in the appended claims.

I claim:

1. A silo unloader for use in a silo having a discharge opening in one side thereof comprising: a main frame supported in the silo; a vertical drive shaft journaled on the frame substantially at the center of the silo; a power unit on the frame for rotating the shaft; a laterally disposed sweep auger having one end adjacent the shaft and the other end adjacent the silo wall; a drive transmission on the shaft and auger effecting rotation of the auger about its axis to cause movement of the material in the silo radially inwardly and to effect movement of the auger laterally and angularly relative to the vertical drive shaft; a laterally disposed radial auger beneath the sweep auger having an outer end adjacent the side of the silo having the discharge opening and effective upon rotation to cut a trench beneath the surface of the material; an impeller on the outer end of the latter auger for receiving material therefrom; a drive transmission on the vertical shaft, driving the auger and impeller for effecting movement of material radially outwardly to the impeller and to impel the material upwardly; and material intercepting means positioned in the opening above the plane of the sweep auger and extending into the silo to intercept the impelled material for directing it outwardly through the opening.

2. A silo unloader for use in a silo having a discharge opening in one side thereof comprising: a main frame supported in the silo; a vertical shaft journaled on the frame centrally located in the silo; a power unit on the frame for rotating the shaft; a laterally disposed sweep conveyor mounted on the frame having one end adjacent the shaft and the other end adjacent the silo wall and adapted to sweep over the surface of the material in the silo; a drive transmission on the shaft driving the conveyor to effect movement of material radially inwardly and to move the conveyor over the surface of the material; a laterally disposed radial discharge auger beneath the sweep conveyor having an outer end adjacent the side of the silo having the discharge opening therein and effective upon rotation to cut a trench beneath the surface of the material; an impeller on the outer end of the auger for receiving material therefrom; drive mechanism responsive to rotation of the shaft to drive the auger and impeller for effecting movement of material radially outwardly to the impeller and to impel the material upwardly; and material intercepting means positioned in the opening above the plane of the sweep conveyor and extending into the silo to intercept the impelled material for directing it outwardly through the opening.

3. A silo unloader for use in a silo having a discharge opening in one side thereof comprising: a main frame supported in the silo; a power unit on the frame; a laterally disposed sweep conveyor mounted on the frame having one end adjacent the shaft and the other end adjacent the silo wall and adapted to sweep over the surface of the material in the silo; drive means extending from the power unit driving the conveyor to effect movement of material radially inwardly and to move the conveyor over the surface of the material; a laterally disposed radial discharge auger beneath the sweep conveyor having an outer end adjacent the side of the silo having the discharge opening therein and effective upon rotation to cut a trench beneath the surface of the material; an impeller on the outer end of the auger for receiving material therefrom; drive means effecting the rotation of the auger and impeller for effecting movement of material radially outwardly to the impeller and to impel the material upwardly; and material intercepting means positioned in the opening above the plane of the sweep conveyor and extending into the silo to intercept the impelled material for directing it outwardly through the opening.

4. A silo unloader for use in a silo having a discharge opening in one side thereof comprising: a main frame supported in the silo; a power unit on the frame; a laterally disposed sweep conveyor mounted on the frame having one end adjacent the shaft and the other end adjacent the silo wall and adapted to sweep over the surface of the material in the silo; drive means extending from the power unit driving the conveyor to effect movement of material radially inwardly and to move the conveyor over the surface of the material; a laterally disposed radial discharge conveyor beneath the sweep conveyor having an outer end adjacent the side of the silo having the discharge opening therein and effective upon operation to cut a trench beneath the surface of the material; an impeller adjacent the outer end of the discharge conveyor for receiving material therefrom; drive means for the discharge conveyor and impeller effecting movement of material upwardly; a deflector plate positioned in the discharge opening with part thereof extending into the silo for intercepting the material from the impeller to direct the material outwardly of the silo through the opening.

5. The invention defined in claim 4 by structural means interconnecting the deflector plate and other frame whereby the frame may move vertically relative to the deflector plate but will be held generally against angular movement.

6. The invention defined in claim 4 in which the discharge conveyor is in the form of an auger with the auger shaft extending beyond the outer end of the auger and the impeller is mounted thereon.

7. A silo unloader for use with a silo having a discharge opening in one side thereof comprising: a main frame supported in the silo including a track formed about an axis closely proximate and parallel to the vertical axis of the silo; a vertical drive shaft journaled on the frame substantially on the aforesaid axis; a drive unit for rotating the shaft; a subframe carried on the vertical shaft for angular movement relative thereto; a rotary wheel on the subframe engageable with the track and operative upon rotation to drive the subframe around the track; a laterally disposed shaft journaled on the subframe and extending from one end proximate the vertical drive shaft to an opposite end adjacent the wall, said laterally disposed shaft having a portion between the ends proximate the rotary wheel; drive means extending from the vertical shaft to the laterally disposed shaft for rotating the latter; drive means extending from the said portion of the laterally disposed shaft to the rotary wheel for rotating the latter; an upright rotary cutter on the end of the laterally disposed wheel for cutting the material proximate the wall; a laterally disposed and radial sweep auger mounted on the subframe having an outer end adjacent the wall and adapted to drive material radially inwardly as the subframe moves around the track; a laterally disposed radial auger beneath the sweep auger having an outer end adjacent the side of the silo having the discharge opening and effective upon rotation to cut a trench beneath the surface of the material; an impeller on the outer end of the latter auger for receiving material therefrom; drive mechanism between the vertical shaft, auger, and impeller for effecting movement of material radially outwardly to the impeller and to impel the material upwardly; and material intercepting means positioned in the opening above the plane of the sweep auger and extending into the silo to intercept the impelled material for directing it outwardly through the opening.

References Cited in the file of this patent

UNITED STATES PATENTS

| | | |
|---|---|---|
| 2,445,056 | Cordis | July 13, 1948 |
| 2,883,253 | Van Dusen | May 26, 1959 |
| 2,914,198 | Hein | Nov. 24, 1959 |
| 2,924,197 | Haen | Feb. 9, 1960 |
| 2,963,327 | Seymour et al. | Dec. 6, 1960 |